INVENTOR:
Paul J. Crane

Attorneys

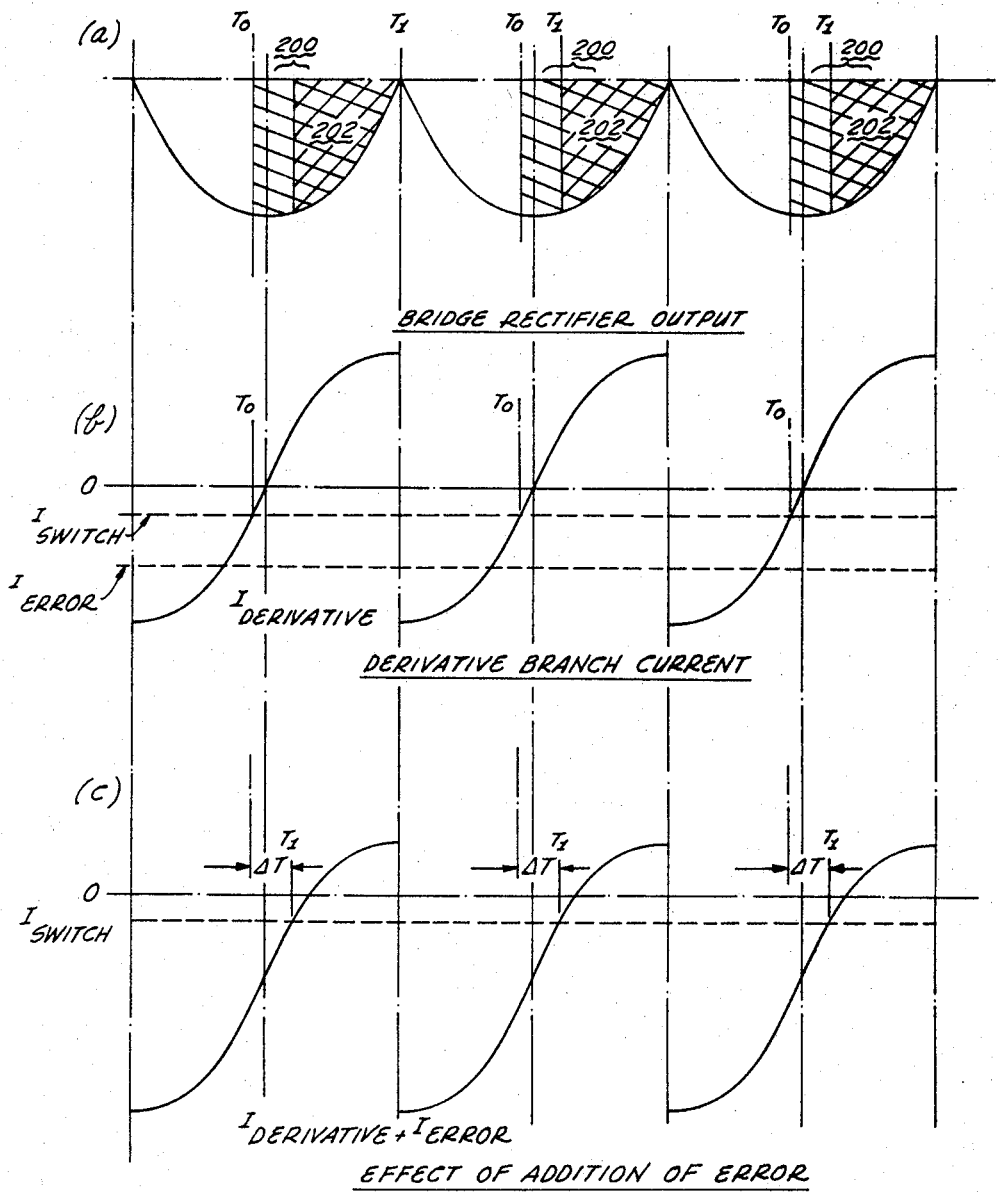

United States Patent Office 3,412,314
Patented Nov. 19, 1968

3,412,314
CYCLICALLY REGULATED POWER SUPPLY
Paul J. Crane, Torrance, Calif., assignor to The Magnavox Company, Torrance, Calif., a corporation of Delaware
Filed July 12, 1965, Ser. No. 471,158
22 Claims. (Cl. 321—16)

ABSTRACT OF THE DISCLOSURE

This invention relates to a system for regulating a cyclically pulsating input voltage of varying amplitude to provide a substantially constant output voltage. The system also regulates for variations in a load to maintain the substantially constant output voltage. The system operates to provide such regulation by controlling the time in which a control signal is produced in the pulsating cycles of the input voltage in accordance with the magnitude of the output voltage.

Figure 1:
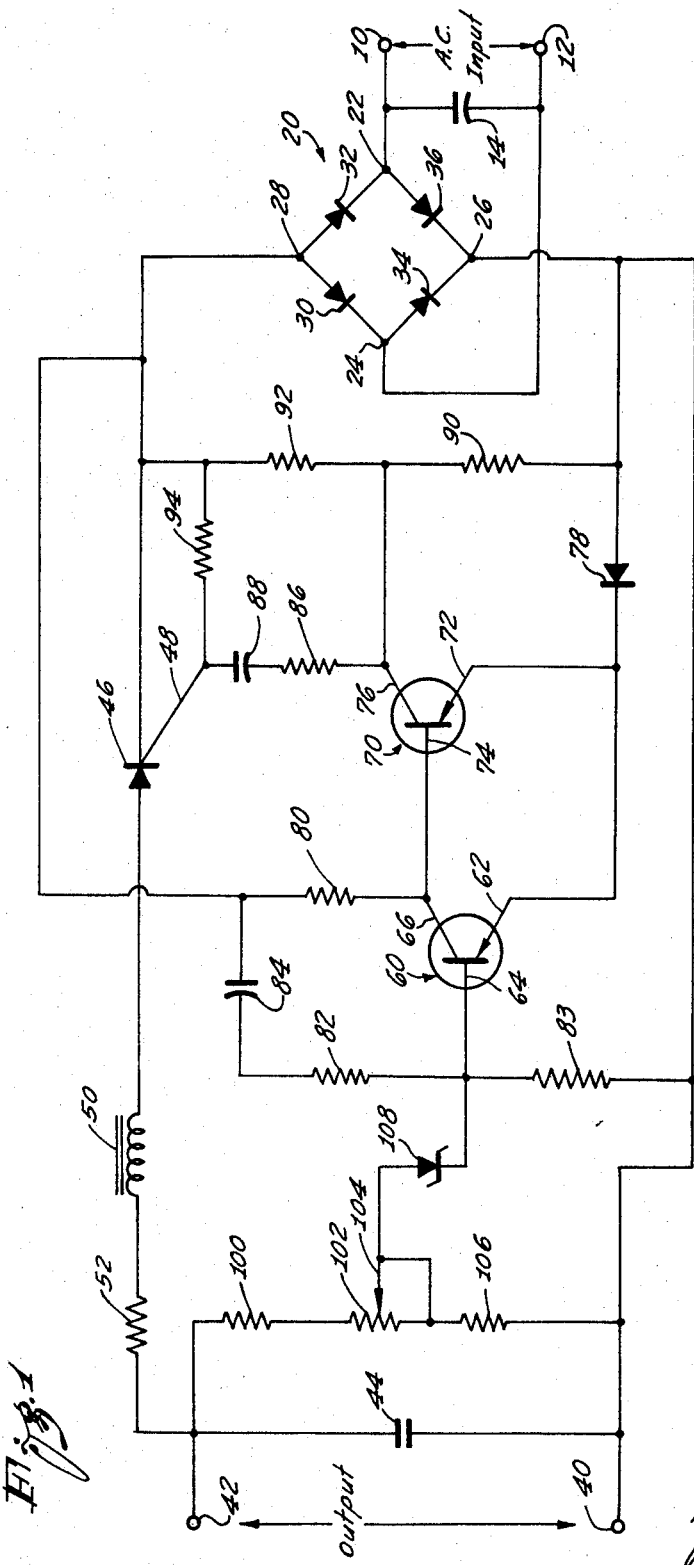

The system includes a switching member having conductive and non-conductive states and connected between the input and the output for introducing the cyclically pulsating input voltage to the output in the conductive state of the switching member. Means are connected in the switching member and to the output for producing a control signal for switching the switching member to the conductive state at a particular time in each cycle for output voltages approximately equal to a particular value and for switching the switching member to the conductive state at a displaced time in the cycles for output voltages greater or less than the particular value. Means are also included for inhibiting the use of the cyclically pulsating input voltage directly by the switching member to switch the switching member to the conductive state.

---

This application relates to electronic circuitry for converting an input signal of alternating current or of varying and uncertain characteristics into a closely regulated output voltage that is substantially unaffected by variations in either input power or output load.

Most power supplies presently in use employ one or more transformers in order to avoid direct couplings between the input terminals and the output terminals of the power supply circuit. Such a transformer, however, is necessarily a very heavy item and bulky as well due to the presence of the primary and secondary windings and often of a core of ferrite or some other metal. In addition to this cumbersomeness, the transformer has an unavoidable adverse affect on circuit performance; for it is an inefficient, heat-producing element, causing a substantial percentage of the total power passing through the circuit to be dissipated without serving any useful purpose to the load or utilizing device to which regulated power is being supplied. Moreover, in some electronic packages, an inefficient device like a transformer can create heating problems simply because there is insufficient air circulation or cooling to dissipate the heat before it can destroy or materially alter the performance of surrounding electronic components, most of which are heat-sensitive to some degree. Although numerous power supply circuits have been developed heretofore in which arrangements of other types of electronic elements have been employed to avoid the use of a transformer, most of these have been either of an unregulated type or complex and inefficient so that they made little or no overall net contribution to improving electronic system performance. The object of the present invention, therefore, is to provide a lightweight, highly efficient, and yet inexpensive power supply circuit in which no transformer need be used.

In the achievement of the above and other objects of the present application, applicant has provided a power supply circuit wherein an AC or other input signal is first rectified and then effectively integrated to provide a filtered DC voltage at the output terminals of the power supply. In between the rectifying means and the integrating means is coupled some sort of electronic switching means through which the rectified current must pass in order to reach the integrating means. Circuitry between the output terminals of the power supply and the electronic switching means provide switching signals whereby just enough power from the rectifying means is passed to maintain the output voltage at a preset and closely regulated level.

As another feature of applicant's invention, this circuitry includes means for differentiating the rectified AC input signal in order that some selected characteristic of that signal (zero-crossing, peak or the like) can be used to switch the electronic switching means alternately on or off.

As another feature of the invention, this pulsing signal may be applied to the electronic switching means through a capacitor which has a low reactance to steep transients like the switching pulse, but which presents very high reactance to the AC input signals which might otherwise have an unwanted turn-on or turn-off effect on the electronic switching means.

As another feature of applicant's invention, in order to provide very close regulation of the output voltage of the power supply circuit, the exact time placement of the zero crossing of the differential of the input signal is varied by the addition of an error from a network sensitive to the level of the output voltage.

A circuit including specific features of this invention is provided with a diode-bridge rectifier having first and second input terminals and first and second output terminals with an AC power source coupled across the first and second input terminals, a first output terminal directly connected to the first output terminal of the diode-bridge rectifier, and a charge-storage capacitor connected between the first output terminal and a second output terminal of the system. To regulate the amount of charge stored in the charge-storage capacitor, a silicon-control rectifier (SCR) having input, output and control electrodes is coupled between the second output terminal of the system and the diode-bridge rectifier second output terminal. To "fire" (i.e., switch into its conductive state), the SCR, first and second transistors, each having an emitter, base and collector, have their emitters connected together and coupled through a diode to the first output terminal of the diode-bridge rectifier. The collector of the first transistor is directly connected to the base of the second transistor. The series combination of a second capacitor and a resistor coupled between the second output terminal of the diode-bridge rectifier and the base of the first transistor differentiates the rectified AC signal to cause the transistors to fire the SCR at a certain time during each bridge rectifier output cycle.

The series combination of a third capacitor connected between the control electrode of the silicon-control rectifier and the collector of the second transistor and a resistor connected from the SCR control electrode to SCR cathode prevents the 120-cycle AC bridge output from affecting the SCR, since the third capacitor has a low reactance as to the steep transistor turn-on voltages, but a high reactance as to the 120-cycle signal. The series combination of a resistor, a variable potentiometer and another resistor connected between the first and second output terminals of the circuit (i.e., across the first or charge-storage capacitor) and a Zener diode connected between the adjustable slide of the variable potentiometer and the base of the first transistor cause the transistor firing time to vary slightly backward of what the input signal differential would dictate. Added capacitors and inductors are provided to prevent radio frequency interference (RFI) and transients from the quick-switching or discharge of the above described elements from affecting the AC supply lines.

Regulators built according to the features discussed above have been able to develop output of about 80 watts with less than 10 watts dissipation. Line regulation shows about plus or minus 1% error for plus or minus 20% input voltage change, while the error in load regulation is less than ±1% from no load to full load.

Other objects and features of applicant's invention and a fuller understanding thereof may be had by referring to the following description and claims taken in conjunction with the accompanying drawing in which:

FIGURE 1 is a schematic of a circuit which is a preferred embodiment of the principles of applicant's invention; and FIGURE 2 shows in time-voltage coordinates the electrical signals at several points of the circuit of FIGURE 1.

Referring to FIGURE 1, a preferred circuit embodying the principles of the invention can derive its input power from any AC source having terminals 10 and 12. A capacitor 14 coupled across the terminals reduces radio frequency interference (RFI) due to switching transients and the like in the circuit to be described than might leak into the power lines to cause unwanted static in radio and television sets in the vicinity. A diode-bridge rectifier 20 having input terminals 22 and 24 and output terminals 26 and 28 uses four diodes 30, 32, 34 and 36. The diodes are connected between the rectifier input terminals 22 and 24 and one of the rectifier output terminals 26 and 28 in such arrangement that either a positive or a negative signal appearing on either of the input terminals 22 or 24 would be blocked by one diode coupled to that terminal, but conducted by the other diode to one of the output terminals 26 or 28. Thus, full wave rectification of alternating current (AC) input signals appearing on the terminals 22 and 24 will be produced at the terminals 26 and 28.

The output terminals for the power supply system shown in the figure are 40 and 42. The output terminal 40 is directly connected to the output terminal 26 of the diode-bridge rectifier 20. A capacitor 44 is coupled across the output terminals 40 and 42, so that the rectified AC out of the diode-bridge rectifier 20 can be stored to provide a smoothed, steady DC voltage across the terminals 40 and 42. It should be pointed out that all of the remaining circuitry in the figure, in effect, intervenes between the output terminal 42 and the output terminal 28 of the diode-bridge rectifier 20 and has as its purpose the metering of power from the diode-bridge rectifier to insure that the DC voltage across the capacitor 44 remains at a certain pre-adjusted level.

The basic power metering device intervening between the rectifier output terminal 28 and the output terminal 42 is shown here as a silicon-control rectifier (SCR) 46 having a control electrode 48. Essentially, the SCR 46 is directly connected between the terminal 28 and the terminal 42, but a choke 50 and a resistor 52 are also in series therewith, the choke 50 to cooperate with the capacitor 14 in preventing RFI from being reflected back into the power source and the resistor 52 to cooperate with the capacitor 44 to create in effect an integrator circuit across the output terminals 40 and 42, while also limiting the maximum charging current in the capacitor 44. The remaining circuitry in the figure has for its purpose the derivation of very precise control signals for switching on the SCR 46; switch-off of the SCR 46 occurs at those points in the rectified AC signal when the current through the SCR 46 becomes very low or tends to be reversed due to the instantaneous bridge output voltage being lower in magnitude than the voltage stored in the capacitor 44.

To generate the gating signals for the SCR 46, two transistors 60 and 70 having emitters 62 and 72, respectively, bases 64 and 74, respectively, and collectors 66 and 76, respectively, are arranged with the emitters 62 and 72 joined together and coupled through a diode 78 to the output terminal 26 of the diode-bridge rectifier 20. The collector 66 of the transistor 60 is coupled electrically through a resistor 80 to the output terminal 28 of the diode-bridge rectifier 20, so that the transistor 60 is essentially coupled across the output terminals of the diode-bridge rectifier 20, but with collector voltage limited by the base of transistor 70. The base 64 of the transistor 60 is coupled to the output terminal 28 through the series combination of a resistor 82 and a capacitor 84 and to the terminal 26 through a resistor 83. The series capacitor 84 serves to impress upon the base 64 of the transistor 60 a current which is in effect the differential of the rectified AC signal appearing on the terminal 28. In other words, the resistor 82 and capacitor 84 act to shift the phase of the signal on the base of a transistor 60 relative to the signal on the emitter of the transistor as shown in FIG. 2a and FIG. 2b. The signal appearing on the collector 66 of the first transistor 60 is directly coupled to the base 74 of the second transistor 70, and the signal appearing on the collector of the transistor 70 is coupled through a resistor 86 (having a low impedance) and capacitor 88 in series to the gate 48 of the SCR 46. The purpose of resistor 86 is to limit the maximum collector current in transistor 70. The purpose of the capacitor 88 intervening between the gate 48 and the collector 76 is to prevent the rectified AC from having a turn-on effect on the SCR 46; for, while the capacitor 88 will have a very low reactance to the steep signals appearing on the collector 76 as a result of the switching on of the transistor 70, the slow rise of the rectified AC will meet with a very high reactance and thus will not be able to reach the gate electrode 48 due to its voltage division with the resistor 94. In order that the transistor 70 may operate at a far lower power level than that appearing across the output terminals 26 and 28, two resistors 90 and 92 perform a voltage division effect for the collector 76, which is directly connected between them. A resistor 94 coupled between the ouptut terminal 28 and the SCR gate 48 performs a voltage dividing effect with the resistor 86 and the capacitor 88 to create the proper voltage level for the pulse impressed on the gate 48 when the transistor 70 switches, and also prevents SCR turn on by leakage currents.

The foregoing circuitry for pulsing the SCR 46 is in effect open-loop, depending on the rectified AC signal appearing across the output terminals 26 and 28 of the diode-bridge rectifier 20 for timing. In order to make applicant's power supply circuit accurate and sensitive, feedback control from the output terminals 40 and 42 is derived by connecting the series combination of the resistor 100, a rheostat 102 having a slide 104 and another resistor 106 thereacross. A Zener diode 108 is coupled between the slide 104 of the rheostat 102 and the base 64 of the transistor 60, so that signals derived by the network 100–108 from the instantaneous voltage level across the output terminals 40 and 42 will have a modifying effect upon the differential derived by the capacitor 84 and applied to the base 64.

In the operation of the above-described circuit, an AC input signal appearing across the terminals 10 and 12 has its positive-going portions conducted through either the diode 34 or the diode 36 to the output terminal 26, while its negative-going portions are conducted through either the diode 30 or the diode 32 to the output terminal 28.

Thus, the output terminal 26 is the positive terminal of the rectifier 20 while the output terminal 28 is the negative terminal. Accordingly, the output terminal 40 of the circuit and its corresponding plate of the capacitor 44 can be said to be positive relative to the output terminal 42 and its corresponding plate of the capacitor 44. This being the case, the SCR 46 when connected as shown can be kept in a conductive state, once switched on, by current flowing from the positive terminal 26 through the capacitor 44 and back to the negative terminal 28, as long as the rectified AC voltage level does not get too near the voltage level stored in the capacitor 44; but once such a current decline occurs, the SCR 46 turns off and stays off until a control signal is applied to its gate electrode 48.

It can be seen that the necessary positive signal to pulse the gate electrode 48 and trigger the rectifier 48 to the conductive state will appear whenever the transistor 70 is made rapidly conductive; for then essentially the only voltage drops between the positive terminal 26 and the collector 76 will be the internal voltage drops in the diode 78 and the transistor 70 itself. Thus, switch-on of the transistor 70 will result in a fast and substantial voltage rise being applied across the capacitor 88 and resistor 86 to the gate electrode 48.

The transistor 70 being of the PNP type, it will be conductive when the current in the resistor 80 flows through the base terminal 74 of the transistor 70. Due to the direct connections of the emitter 62 and 72 and the connection of the collector 66 of the transistor 60 with the base 74 of the transistor 70, it can be seen that, when the transistor 60 is conductive, the current in the resistor 80 is shunted to the collector 66 of the transistor 60 instead of to the base 74 of the transistor 70, forcing the transistor 70 to be nonconductive. On the other hand, when the transistor 60 is shut off or nonconductive, the current in resistor 80 will flow through the base 74 of the transistor 70 to cause a rapid switch-on of the transistor 70 and the passage of the gate pulse to the SCR 46.

The transistor 60 will normally be maintained conductive during the first half of each rectifier output pulse by the differential current flowing in the branch formed by the resistor 82 and the capacitor 84 (FIG. 2b). However, near the peak of the rectified AC signal across the terminals 26 and 28, the charge accumulated by the capacitor 84 causes the voltage across its plates to become greater than the corresponding instantaneous voltage across the terminals 26 and 28 so that the differential current then passes through zero and reverses direction rendering the transistor 60 non-conductive. Accordingly, the current in the reisstor 80 transfers from the terminal 66 to the terminal 74; whereupon the transistor 70 pulses the SCR 46 on in the manner described above.

Referring to FIGURE 2, the relative voltages on the diode-bridge rectifier output terminals 26 and 28 are shown in FIG. 2a and the corresponding current at the base 64 of the transistor 60 is shown in FIG. 2b. In FIG. 2b $T_0$ and $I_{switch}$ represent the no-error switching instant and switching threshold of drive current of transistor 60. It should be noted that $I_{switch}$ is not zero since current must be supplied to resistor R83 and more-than-zero current is required to switch on the transistor 60. The current $I_{derivative}$ in the base 64 is shifted in time relative to the voltage on the terminal 28 partly because of the phase-shifting action provided by the capacitor 84 and the resistor 82. At a certain time in the cycle, marked $T_0$ current in the base 64 drops near enough to zero so that the emitter-base diode of the transistor 60 is no longer conducting and the transistor 60 will accordingly be turned off. The resulting turn-on of the transistor 70 and opening of the SCR 46 causes the shaded portions 200 of the rectified AC input signal between the terminals 26 and 28 to be passed for storage in the capacitor 44 and ultimate consumption in the load across the output terminals 40 and 42. The exact point in the rectified AC input cycle as shown in FIG. 2a where the SCR 46 is turned on determines how much power is passed to the capacitor 44 i.e., whatever of the cycle remains after SCR turn-on. Alone, the differentiating capacitor 84 would cause turn-on of the SCR 46 at the peak of the waveform shown in FIG. 2a, but the diode 78 and the base emitter diode of the transistor 60, which by their internal voltage drop ensure that the base 64 conduction voltage is a fraction of a volt below the terminal 26, moves the transistor 60 switching time slightly forward of the peak shown in FIG. 2b. Then, in the dynamic operation of the circuit, the voltage divider 100, 102 and 106 raises the current on the base 64 through the diode 108 as the energy stored in the capacitor 44 rises, to provide a delaying effect on the turn-off of the transistor 60 and thus the equilibrium whereby output voltage is held constant. This effect is shown in FIG. 2c by the shift $\Delta T$ from $T_0$ to $T_1$.

From the closeness of the response of the switching transistor 60 to the rectified AC input waveform across the terminals 26 and 28, it can be seen that a very fine control of the amount of power passed by the SCR 46 can be accomplished with the transistor 60. In effect, control can be achieved merely by instantaneous variation of the operating level of the control electrode of the transistor 60 derived from the instantaneous level of the output voltage of the power supply. One strong factor in the success of the invention is the absence of smoothing capacitors or the like across the rectifier terminals 26 and 28. These smoothing capacitors would result in the signal in the metering circuitry being relatively smooth rather than the rectified AC waveform of FIG. 2a; for it is the rectified AC that makes it possible to switch the SCR 46 on and off so accurately and to vary the switching time in such minute detail that very fine regulation can be achieved across the output terminals 40 and 42. Once this principle is applied and the power metering function is performed while the input signal is still in some sort of very regular AC form, then the metering circuitry can perform with extreme accuracy that would be impossible where a very slowly varying DC voltage is involved. Although the arrangement and type of active elements in the metering circuitry could be varied somewhat once the principle of AC metering is applied, there are inventive features in the metering network in the use of the differentiating capacitor 84 to develop sharp switching signals for the active elements and the use of the capacitor 88 to pass steep switching signals to the active element directly connected with metering, while at the same time preventing the AC waveform being metered from influencing on and off times and switching therebetween of the metering active element.

The feedback provided by the resistors 100 and 106, the rheostat 104 and the Zener diode 108 operates to regulate the output voltage between the terminals 40 and 42. For example, when the output voltage on the terminal 42 becomes too negative, the current on the base 64 of the transistor 60 rises due to T error, FIG. 2b. This causes the transistor 60 to become nonconductive at a later time $T_1$ in each cycle of the voltage in FIGURE 2 than the time $T_0$ in which the transistor 60 becomes nonconductive in each cycle before the rise in voltage. This results in part from the fact that the current fed back to the base of the transistor 60 from the rheostat 102 is fairly constant since it does not change on an instantaneous basis with changes in the input voltage. Since the transistor 60 becomes nonconductive at a later time in each half cycle, the SCR 46 also becomes conductive at a later time in each half cycle. This causes the capacitor 44 to receive a charge for a reduced time in each half cycle, thereby permitting less power to be stored (only the smaller shaded portions 202). In like manner, the transistor 60 becomes nonconductive and the SCR 46 becomes conductive at an earlier time in each half cycle when the output voltage at the terminal 42 becomes less negative, thereby maintaining the charge in the capacitor 44 substantially constant.

A circuit according to the schematic of FIGURE 1 was built and operated using the following components:

AC Input

95–135 v., 60 c.p.s.

Active Elements

46—Motorola MCR 1304–4
60—2N404 or 2N3638
70—2N404A or 2N3638

Diodes

108—VR 80A (Sarkes Tarzian)
30—Semtech 3S2E
32—Semtech 3S2E
34—Semtech 3S2E
36—Semtech 3S2E
78—Semtech SC–2

Resistors (ohms)

| | |
|---|---|
| 52—5 | 102—10K |
| 80—51K | 106—30K |
| 83—4.7K | 90—3.3K |
| 86—510 | 92—33K |
| 82—51K | 94—510 |
| 100—4.3K | |

Capacitors (microfarads)

| | |
|---|---|
| 14—0.1 | 84—0.01 |
| 44—3,400 | 88—.005 |

Inductors (millihenries)

50—0.1

The power supply built according to the above specification developed output of short 80 watts with less than 10 watts dissipation, for great efficiency (about 85%). Additionally, the regulation achieved is so fine that line regulation shows about plus or minus 1% error for +20% change in input, while the error in load regulation was far less than +1% from no load to full load. Thus, applicant has provided a lightweight, efficient and yet inexpensive power supply circuit wherein an AC or other input signal is first rectified and then effectively integrated to provide a smooth DC voltage at the output terminals of the power supply. In between the rectifying means and the integrating means is coupled electronic switching means of the type shown in FIGURE 1 or some analogous element through which the rectified current must pass in order to reach the integrating means; and then associated with the electronic switching means there is circuitry adapted to derive switching signals whereby just enough power from the rectifying means is passed to maintain the output voltage at a present and closely regulated level.

Although the invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention as hereinafter claimed. Wide ranges of voltages, frequencies and currents may be accommodated by the above described circuit merely by selection of similar component types with appropriate ratings.

What is claimed is:
1. In combination, a regulator circuit for converting input signals into a closely regulated DC output voltage:
   rectifying means having first and second input terminals and first and second output terminals;
   a power source having first and second terminals, the first terminal of the power source being coupled to the first input terminal of the rectifying means and the second terminal of the power source being coupled to the second input terminal of the rectifying means;
   first and second regulator circuit output terminals, the first regulator circuit output terminal being directly connected to the first output terminal of the rectifying means;
   a first capacitor connected between the first regulator circuit output terminal and the second regulator circuit output terminal;
   a silicon-control rectifier having input, output and control electrodes coupled between the second regulator circuit output terminal and the second output terminal of the rectifying means;
   first and second transistors each having an emitter, base and collector, the emitters of the first and second transistors being connected together and coupled through a diode to the first output terminal of the rectifying means and the collector of the first transistor being directly connected to the base of the second transistor;
   a second capacitor coupled between the second output terminal of the rectifying means and the base of the first transistor;
   a third capacitor connected between the control electrode of the silicon-control rectifier and the collector of the second transistor;
   the series combination of a first resistor, a variable potentiometer and a second resistor connected between the first and second regulator circuit output terminals, the variable potentiometer having an adjustable slide; and
   a Zener diode having first and second electrodes, the first electrode of the Zener diode being connected to the adjustable slide of the variable potentiometer and the second electrode of the Zener diode being directly connected to the base of the first transistor.

2. In combination, a regulator circuit for converting AC input signals into a closely regulated DC output voltage:
   a diode-bridge rectifier having first and second input terminals and first and second output terminals;
   an AC power source having first and second terminals, the first terminal of the AC power source being coupled to the first input terminal of the diode-bridge rectifier and the second terminal of the AC power source being coupled to the second input terminal of the diode-bridge rectifier;
   first and second regulator circuit output terminals, the first regulator circuit output terminal being directly connected to the first output terminal of the diode-bridge rectifier;
   a first capacitor connected between the first regulator circuit output terminal and the second regulator circuit output terminal;
   the series combination of a first resistor, a first inductor and a silicon-control rectifier having input, output and control electrodes coupled between the second regulator circuit output terminal and the second output terminal of the diode-bridge rectifier;
   first and second transistors each having an emitter, base and collector, the emitters of the first and second transistors being connected together and coupled through a diode to the first output terminal of the diode-bridge rectifier and the collector of the first transistor being directly connected to the base of the second transistor and connected through a second resistor to the second output terminal of the diode-bridge rectifier;
   the series combination of a second capacitor and a third resistor coupled between the second output terminal of the diode-bridge rectifier and the base of the first transistor;
   the series combination of a third capacitor and a fourth resistor connected between the control electrode of the silicon-control rectifier and the collector of the second transistor;

a fifth resistor connected between the control electrode of the silicon-control rectifier and the second output terminal of the diode-bridge rectifier;

a sixth resistor coupled between the first output terminal of the diode-bridge rectifier and the collector of the second transistor;

a seventh resistor connected between the second output terminal of the diode-bridge rectifier and the collector of the second transistor;

the series combination of an eighth resistor, a variable potentiometer, and a ninth resistor connected between the first and second regulator circuit output terminals, the variable potentiometer having an adjustable slide;

a Zener diode having first and second electrodes, the first electrode of the Zener diode being connected to the adjustable slide of the variable potentiometer and the second electrode of the Zener diode being directly connected to the base of the first transistor and connected through a tenth resistor to the first output terminal of the diode-bridge rectifier; and a fourth capacitor coupled between the first and second AC input terminals.

3. In combination for supplying from a cyclically pulsating voltage a closely regulated DC voltage across first and second output terminals:

a power source having first and second terminals for receiving the pulsating voltage, the first terminal of the power source being coupled to the first output terminal;

gating means having conductive and non-conductive states and coupled between the second output terminal and the second terminal of the power source to introduce, from the second terminal to the second output terminal during the conductive state of the gating means, a voltage in accordance with the voltage on the second terminal and to inhibit the introduction of such voltage to the second output terminal during the non-conductive state in the gating means;

first means electrically connected to the gating means and responsive to an input signal for switching the gating means between the non-conductive and conductive states at a controlled instant in each cycle of the pulsating voltage in accordance with the characteristics of the input signal; and second means electrically connected to the first means and to the first and second output terminals for deriving from the instantaneous level of voltage across the first and second output terminals a signal for introduction to the first means as the input signal to alter in each cycle of the pulsating voltage the time placement of the switching of the gating means between the non-conductive and conductive states.

4. In combination for supplying from a cyclically pulsating voltage a closely regulated DC voltage across first and second output terminals:

a power source having first and second terminals for receiving the pulsating voltage, the first terminal of the power source being connected to the first output terminal;

gating means having conductive and non-conductive states and coupled between the second output terminal and the second terminal of the power source to introduce, from the second terminal to the second output terminal during the conductive state of the gating means, a voltage in the conductive state of the gating means in accordance with the voltage on the second terminal and to inhibit the introduction of such voltage to the second output terminal in the non-conductive state of the gating means;

first means electrically connected to the gating means and responsive to an input signal for switching the gating means between the non-conductive and conductive states at a variable instant in each cycle of the pulsating voltage in accordance with the characteristics of the input signal;

charge-storage means operatively connected between the first and second output terminals to smooth into a substantially direct voltage the voltage introduced to the second output terminal; and second means electrically connected to the first means and to the charge-storage means for deriving from the direct voltage in the charge-storage means a signal for introduction as an input signal to the first means to vary the time for switching the gating means between the non-conductive and conductive states.

5. The combination set forth in claim 4, including reactance means connected between the first means and the gating means for switching the gating means between the non-conductive and conductive states in accordance with the characteristics of the input signal and for inhibiting such switching of the gating means in response to the pulsating voltage.

6. The combination set forth in claim 5 wherein the gating means includes a silicon-controlled rectifier having input and output and control electrodes and wherein the control electrode is coupled to the first means and the input and output electrodes are respectively coupled to the second terminal of the power source and the second output terminal.

7. In combination for supplying from a cyclically pulsating voltage a closely regulated DC voltage across first and second output terminals:

a power source having first and second terminals for receiving the pulsating voltage, the first terminal of the power source being coupled to the first output terminal;

gating means having conductive and non-conductive states, the gating means being coupled between the second output terminal and the second terminal of the power source to introduce, from the second terminal to the second output terminal during the conductive state of the gating means, a voltage in the conductive state in accordance with the voltage on the second terminal and to inhibit the introduction of such a voltage in tthe non-conductive state;

charge-storage means connected between the first output terminal and the second output terminal;

means electrically connected to the charge-storage means for deriving control signals from the characteristics of the signals across the charge-storage means for the switching of the gating means between the non-conductive and conductive states at a time in the cycles of the pulsating voltage dependent upon the characteristics of the control signals to maintain the power stored in the charge-storage means at a constant level; and means electrically connected to the gating means and to the last mentioned means for introducing the control signals to the gating means to provide the controlled switching of the gating means between the non-conductive and the conductive states in accordance with the characteristics of the control signals.

8. The combination set forth in claim 7, including, means electrically connected between the gating means and the last mentioned means for introducing the control signals from the last mentioned means to the gating means but for inhibiting the introduction of the pulsating voltage to the gating means to switch the gating means between the conductive and non-conductive states.

9. In combination for supplying from a cyclically pulsating voltage a closely regulated DC voltage across first and second regulator output terminals:

a power source having first and second terminals for producing the pulsating voltage;

rectifying means having first and second input terminals and first and second output terminals, the first and second input terminals being coupled across the power source terminals and the first output terminal of the rectifying means being coupled to the first regulator output terminal;

gating means having conductive and non-conductive states, the gating means being coupled between the second output terminal of the regulator and the second output terminal of the rectifying means to introduce a voltage from the second output terminal of the rectifying means to the second regulator output terminal during the conductive state of the gating means and to inhibit the introduction of such a voltage in the non-conductive state, said gating means being responsive to an input signal for switching the gating means between the non-conductive and conductive states;

a first capacitor connected between the first and second regulator output terminals for deriving a direct voltage in accordance with the characteristics of the age between the first and second regulator output terminals, first means electrically coupled to the first capacitor for deriving control signals from the characteristics of the direct voltage across the first capacitor, second means electrically coupled to the first means and to the control electrode of the gating means for introducing the control signals to the gating means as the input signal to trigger the gating means between the non-conductive and conductive states at a controlled time in the cycles of the pulsating voltage in accordance with the characteristics of the control signals; and a second capacitor connected between the second means and the gating means to pass the control signals from the second means to the gating means for the switching of the gating means between the non-conductive and conductive states without allowing the pulsating voltage to produce such switching of the gating means.

10. The combination set forth in claim 9 wherein the gating means includes a silicon control rectifier having input, output and control electrodes and wherein the input and output terminals are respectively coupled to the second output terminal of the rectifying means and the second output terminal of the regulator and wherein the control electrode is coupled to the second means.

11. In combination for converting input signals at first and second input terminals into a closely regulated DC output voltage:

switching means having conductive and non-conductive states, the switching means being coupled between the first input terminal and the first output terminal for passing the input signals at the first and second input terminals to the first and second output terminals in the conductive state;

the second input terminal being connected to the second output terminal;

first means connected between the first output terminal and the second output terminal to provide a direct voltage corresponding to the pulsating voltage between the first and second output terminals;

semi-conductor means having first, second and third electrodes and having conductive and non-conductive states, the third electrode of the semi-conductor means being coupled to the switching means to supply signals for triggering the switching means between the non-conductive and conductive states upon a change in the operation of the semi-conductor means between the non-conductive and conductive states;

a diode coupled between the first electrode of the semi-conductor means and the second input terminal; and means responsive to the voltage across the first means and coupled to the second electrode of the semi-conductor means for deriving a control signal from the voltage across the first means for controlling the time at which the semi-conductor means is switched between the non-conductive and conductive states.

12. The combination set forth in claim 11 wherein means are connected between the switching means and the third electrode of the semi-conductor means for passing the signals from the semi-conductor means to the switching means and for inhibiting the passage of the input signals to the switching means to trigger the switching means.

13. In combination for supplying from a cyclically pulsating voltage a closely regulated DC voltage across first and second regulator output terminals:

a power control having first and second terminals for receiving the pulsating voltage, the first terminal of the power control being coupled to the first regulator output terminal;

gating means having conductive and non-conductive states, the gating means being coupled between the second regulator output terminal and the second terminal of the power control to introduce, from the second terminal of the power control to the second regulator output terminal during the conductive state of the gating means, a voltage in accordance with the voltage on the second regulator output terminal and to inhibit the introduction of such a voltage in the non-conductive state of the gating means;

means connected between the first regulator output terminal and the second regulator output terminal to produce a direct voltage in accordance with the introduction of the pulsating voltage between the first regulator output terminal and the second regulator output terminal;

first means responsive to an input signal for switching the gating means between the non-conductive and conductive states in each cycle of the pulsating voltage at a controlled instant dependent upon the characteristics of the input signal;

second means electrically connected to the direct voltage means for deriving from the instantaneous level of voltage across the direct voltage means a signal having characteristics dependent upon such instantaneous level of voltage; and third means electrically connected to the first and second means for introducing the signal from the second means to the first means as the input signal to the first means.

14. The combination set forth in claim 13 wherein means are connected between the first means and the gating means for providing for the switching of the gating means between the non-conductive and conductive states in accordance with the introduction of the input signal to the first means and for inhibiting the pulsating voltage from switching the gating means between the non-conductive and conductive states.

15. In combination for supplying from a cyclically pulsating voltage a closely regulated DC voltage across first and second regulator output terminals:

a power source having first and second terminals and constructed to provide a pulsating voltage;

rectifying means having first and second input terminals and first and second output terminals, the first and second input terminals being coupled across the first and second terminals of the power source and the first output terminal being coupled to the first regulator output terminal;

gating means having conductive and non-conductive states, the gating means being coupled between the second regulator output terminal and the second output termnial of the rectifying means to introduce, from the second output terminal of the rectifying means to the second regulator output terminal, a voltage during the conductive state of the gating means in accordance with the voltage on the second terminal and to inhibit the introduction of such a voltage during the non-conudctive state in the gating means;

means connected between the first and second regulator output terminals to convert the pulsating voltage to a direct voltage in accordance with the characteristics of the pulsating voltage;

first means electrically connected to the gating means and responsive to an input signal for switching the gating means between the non-conductive and conductive states in each cycle of the pulsating voltage at a controlled instant dependent upon the characteristics of the input signal;

second means having characteristics for providing a first voltage upon the introduction of voltages less than a particular value and having characteristics of providing a second voltage different from the first voltage upon the introduction of signals greater than the particular value, third means electrically connected to the second means for deriving from the instantaneous level of voltage across the direct voltage means a signal having characteristics dependent upon the direct voltage across the direct voltage means as modified by the operation of the second means; and fourth means electrically connected to the first and third means for introducing the signal from the third means to the first means as the input signal to the first means.

16. The combination set forth in claim 15 wherein means are connected between the first means and the gating means for switching the gating means between the non-conductive and conductive states in accordance with the introduction of the input signal to the first means and for preventing the pulsating signal from switching the gating means between the conductive and non-conductive states.

17. In combination for converting input signals at first and second input terminals into a closely regulated DC output voltage at first and second output terminals:

rectifying means having first and second input terminals and first and second output terminals, the first and second input terminals of the rectifying means being connected to the first and second input terminals and the first output terminal of the rectifying means being coupled to the first output terminal;

switching means having conductive and non-conductive states, the switching means being coupled between the second output terminal and the second output terminal of the rectifying means, a diode, first and second transistors each having an emitter, base and collector, the emitters of the first and second transistors being connected together and coupled through the diode to the first output terminal of the rectifying means, the collector of the first transistor being directly connected to the base of the second transistor and the collector of the second transistor being coupled to the switching means to change the state of the switching means between the non-conductive and conductive states;

a capacitor connected between the first output terminal and the second output terminal to produce a direct voltage in accordance with the characteristics of the input signal;

first means including the first and second transistors and electrically connected to the switching means and the capacitor for driving signals from the direct voltage across the capacitor to switch the switching means between the non-conductive and conductive states; and second means electrically connected to the first means and the capacitor for deriving from the level of voltage across the capacitor a signal for altering the time placement of the switching signals produced by the first means for capacitor voltages less than a particular level.

18. In combination for converting cyclically pulsating input signals at first and second input terminals into a closely regulated DC output voltage at first and second output terminals:

charge-storage means connected between the first output terminal and the second output terminal to provide a direct voltage;

rectifying means having first and second input terminals and first and second output terminals, the first and second input terminals of the rectifying means being connected to the first and second input terminals and the first output terminal of the rectifying means being coupled to the first output terminal;

switching means having conductive and non-conductive states, the switching means being coupled between the second output terminal and the second output terminal of the rectifying means to pass the pulsating input signals to the second output terminal in the conductive state and to inhibit the passage of the pulsating input signals to the second output terminal in the non-conductive state;

first means electrically connected to the gating means and to the charge-storage means for deriving control signals from the characteristics of the signals across the charge-storage means to switch the gating means between the non-conductive and conductive states in variably timed relationship to the cyclical pulsations in the cyclically pulsating input signals to maintain the voltage in the charge-storage means at a substantially constant level; and second means electrically connected to the first means for inhibiting the introduction of the cyclically pulsating input signals to the last mentioned means to switch the gating means between the conductive and non-conductive states.

19. The combination set forth in claim 18 wherein third means are included in the first means and are constructed to provide a first voltage for voltages at least equal to a particular level in the charge-storage means and to provide a second voltage different from the first voltage for voltages less than the particular level and wherein the third means are operative in the first means to shift the timed relationship in which the switching means are shifted between the non-conductive and conductive states in the cyclical pulsations.

20. The combination set forth in claim 19 wherein the third means includes a Zener diode.

21. In combination for converting cyclically pulsating input signals at first and second input terminals into a closely regulated DC output voltage at first and second output terminals:

capacitor means connected between the first output terminal and the second output terminal to produce a direct voltage in accordance with the amplitude of the cyclically pulsating input signals;

rectifying means having first and second input terminals and first and second output terminals, the first and second input terminals of the rectifying means being respectively coupled to the first and second input terminals and the first output terminal of the rectifying means being coupled to the first output terminal;

switching means having conductive and non-conductive states, the switching means being coupled between the second output terminal and the second output terminal of the rectifying means to introduce the pulsating input signals to the second output terminal in the conductive state and to inhibit such introduction in the non-conductive state;

means electrically connected to the switching means and to the capacitor means for deriving control signals from the characteristics of the direct voltage across the capacitor means for switching the switching means between the non-conductive and conductive states in accordance with the characteristics of the control signals; and means electrically connected to the switching means for inhibiting the introduction of the pulsating input signals to trigger the switching means between the conductve and non-conductive states.

22. In combination, a regulated power supply circuit for converting cyclically pulsating input signals applied to first and second input terminals into a closely regulated DC output voltage appearing at first and second regulator output terminals having:

a capacitor connected between the first regulator output terminal and the second regulator output terminal;

rectifying means having first and second input terminals and first and second output terminals, the first and second input terminals of the rectifying means being connected to the first and second input terminals and the first output terminal of the rectifying means being coupled to the first regulator output terminal;

switching means having conductive and non-conductive states, the switching means being coupled between the second regulator output terminal and the second output terminal of the rectifying means;

a diode, first and second transistors each having an emitter, base and collector, the emitters of the first and second transistors being connected together and coupled through the diode to the first output terminal of the rectifying means, the collector of the first transistor being direcly connected to the base of the second transistor and the collector of the second transistor being coupled to the switching means to supply signals to the switching means to change the state of the switching means between the conductive and non-conductive states;

differentiating means coupled between the second output terminal of the rectifying means and the base of the first transistor;

a variable potentiometer having an adjustable slide connected between the first and second regulator circuit output terminals; and a Zener diode having first and second electrodes, the first electrode of the Zener diode being connected to the adjustable slide of the variable potentiometer and the second electrode of the Zener diode being directly connected to the base of the first transistor.

References Cited

UNITED STATES PATENTS

| | | | |
|---|---|---|---|
| 3,204,172 | 8/1965 | Darling et al. | 321—18 X |
| 3,221,241 | 11/1965 | Greenberg et al. | |
| 3,241,044 | 3/1966 | Mills | 321—18 X |
| 3,293,532 | 12/1966 | Dubin et al. | 321—18 |
| 3,304,438 | 2/1967 | Muskovac. | |

ORIS L. RADER, *Primary Examiner.*

H. HUBERFELD, *Assistant Examiner.*